United States Patent [19]
Battin et al.

[11] 3,923,901
[45] Dec. 2, 1975

[54] PARTIAL ALKYLATION OF POLYHYDROXYBENZOPHENONES

[75] Inventors: Dale Edward Battin, Parkersburg, W. Va.; Harold Godfred Thompson, Somerville, N.J.

[73] Assignee: American Cyanamid Company, Stamford, Conn.

[22] Filed: Aug. 31, 1973

[21] Appl. No.: 393,375

Related U.S. Application Data

[63] Continuation-in-part of Ser. No. 66,882, Aug. 25, 1970, abandoned.

[52] U.S. Cl. ................................. 260/591
[51] Int. Cl.$^2$ .................... C07C 49/80; C07C 49/84
[58] Field of Search ...................................... 260/591

[56] References Cited
UNITED STATES PATENTS 2,675,367  4/1954  Caldwell ............................ 260/591

OTHER PUBLICATIONS

Groggins, Unit Processes in Organic Synthesis, p. 624 (1952).
Wagner & Zook, Synthetic Organic Chemistry, pp. 226 & 227, 5th Printing, 1965.

*Primary Examiner*—D. Horwitz
*Attorney, Agent, or Firm*—John L. Sullivan

[57] ABSTRACT

The partial alkylation of a polyhydroxybenzophenone having ortho- and para-hydroxy substituents to form an ortho-hydroxy, para-alkoxy benzophenone is carried out in the presence of a specified solvent, viz., a lower alkyl ether of ethylene glycol or diethylene glycol, whereby higher yields of alkylate product are obtained in shorter reaction times, particularly when the alkyl halide alkylating agent is an alkyl chloride. The employment of a metal bromide or iodide as catalyst further enhances the reaction rate and product yield.

7 Claims, No Drawings

PARTIAL ALKYLATION OF POLYHYDROXYBENZOPHENONES

This application is a continuation-in-part of application Ser. No. 66,882, filed Aug. 25, 1970, now abandoned.

This invention relates to an improved process for the alkylation of hydroxybenzophenones. More particularly, it relates to the partial alkylation of polyhydroxybenzophenones having both ortho- and para-hydroxy substituents and represented by the formula:

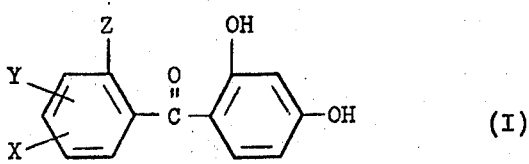

where Z is hydrogen, alkyl, alkoxy, halogen, carboxy, carbalkoxy, or hydroxy and where X and Y individually are hydrogen, alkyl, alkoxy, halogen, carboxy, carbalkoxy or hydroxy, provided that where either X or Y is hydroxy the other is not hydroxy, to form ortho-hydroxy, para-alkoxybenzophenones of the formula:

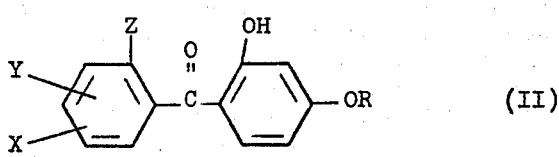

where R is alkyl, Z is as defined above, and X and Y are hydrogen, alkyl, alkoxy, halogen, carboxy, or carbalkoxy.

It is well known that certain benzophenones substituted with hydroxy and alkoxy groups are useful as ultraviolet absorbers for incorporation in various compositions. Furthermore, it is well known that such compounds, to be useful as UV absorbers, must contain at least one hydroxy group ortho to the carbonyl group of the benzophenone. Use of such compounds is described, for example, in Day et al., U.S. Pat. No. 2,777,828; Armitage et al., U.S. Pat. Nos. 3,005,959 and 3,098,842; and Lappin et al., U.S. Pat. No. 2,861,053. They are particularly useful as light stabilizers in resinous compositions such as polyolefins, particularly polypropylene, unsaturated polyesters resins, and other resinous compositions of various types such as polyvinyl chloride, styrene polymers, styrene-acrylonitrile copolymers, polyacrylates, and the like.

The o-hydroxy, p-alkoxybenzophenones prepared by the process of this invention have been prepared in several ways in the past. One such method has been described by Hardy et al., U.S. Pat. No. 2,773,903, in which a suitable benzoyl chloride is reacted with a dialkoxy benzene in the presence of a stoichiometric amount of AlCl$_3$ and small amounts of dimethylformamide. Upon heating the reaction mixture after the initial reaction, the alkoxy group ortho to the carbonyl group undergoes a dealkylation to restore the hydroxy group. The process has certain deficiencies due to the unavailability of starting materials for the preparation of some of the most desirable compositions. Preparation of such intermediates would involve extra steps to the process and add to the cost.

Another method which has been used is the direct alkylation of hydroxybenzophenones to the desired hydroxyalkoxybenzophenones with alkyl bromides. See U.S. 2,861,053. Use of alkyl bromides was necessary because the more readily available and less expensive alkyl chlorides, having a lower degree of reactivity, required lengthy reaction times to achieve only mediocre yields of the desired products. These alkylation reactions were conducted in solvents such as acetone, sec. butanol, or isopropanol. British Pat. No. 1,167,678 describes the preparation of the compounds in an aliphatic ketone using an inorganic iodide catalyst. In this process the yields of product are low. Although the yields of desired products using an alkyl bromide have been adequate, the process has involved lengthy reaction times (15 hours and more) and certain tedious recovery techniques, such as filtrate concentration and, in some cases, recrystallization to achieve optimum product purity. Moreover, the process was expensive for the reasons previously stated. What is needed, therefore, is an improved process in which the alkyl halides, particularly the alkyl chlorides, can be used effectively, i.e., in which the reaction time is reduced and a high yield of pure alkylated product is obtained. It is the object of this invention to provide such a process.

It has now been found that the alkylation can be effected in higher yield and shorter time, particularly when the alkylating agent is an alkyl chloride, if the reaction is conducted in a lower alkyl ether of ethylene glycol or diethylene glycol. It has also been found that the reaction can be further increased by the use of a small amount of a metal bromide, or iodide, as catalyst; the sodium and potassium iodides are preferred.

A copending application of Martin B. Bochner and Dale E. Battin, Ser. No. 718,932, now abandoned, describes the use of a solvent selected from dimethylformamide, dimethylacetamide, tert. butylformamide, and dimethylsulfoxide in the same reaction. Although there is an apparent increase in the rate of reaction and in yield with the use of these solvents, particularly with dimethylformamide, there is a noticeable solvent decomposition leading to the formation of amines and formates which contaminate the product and solvent. This limits the purity of the product and reduces the number of times the solvent can be recycled.

The solvents of this invention lead to improvements over the prior art in that (1) the batch size can be considerably increased, (2) it is less expensive, (3) recovery of the solvent is easier, (4) hydrolysis of the alkyl halide to the alcohol is eliminated, and (5) lower usage of the alkyl halide because of the inertness of the solvent. The major advantage to be obtained is that more pounds of product can be obtained per pound of solvent using the solvents of this invention. The preferred solvent, cellosolve, can be recycled up to about 10 times with each batch with twice as much product being produced per batch.

In carrying out the process of the invention, a reaction mixture comprising the appropriate polyhydroxybenzophenone and alkyl halide reactants, an alkali acid acceptor, metal bromide or iodide catalyst (if used) and the solvent, are heated to reflux, distilling off any water which may be present and that which may be formed in the reaction. After a suitable reaction time a small amount of sodium hydrosulfite is added to reduce the color or zinc dust and phosphoric acid may be used to reduce color bodies. The mixture is then clarified. The filter cake is washed with solvent and the combined filtrates cooled to 25°–30°C. Crystallization is allowed to proceed with agitation at this temperature for about 30 minutes, and then cooled to 0°–5°C. for about 1 to 1.5 hours. The product is isolated by filtration and dried.

Among the hydroxybenzophenones of general formula I which may be used in accordance with the process of this invention are included:

2,4-dihydroxybenzophenone
2,2′,4-trihydroxybenzophenone
2,2′4-trihydroxy-4′-methylbenzophenone
2,2′,4-trihydroxy-4′-methoxybenzophenone
2,2′,4-trihydroxy-4′-chlorobenzophenone
2,4-dihydroxy-4′-tert. butylbenzophenone
2,4-dihydroxy-4′-methylbenzophenone
2,4-dihydroxy-4′-chlorobenzophenone
2,4-dihydroxy-3′,5′-dimethylbenzophenone
2,4-dihydroxy-3′,5′-dimethoxybenzophenone
2,4-dihydroxy-3′,5′-dichlorobenzophenone
2,2′,4,4′-tetrahydroxybenzophenone
2-carboxy-4,4′-dihydroxybenzophenone
3-carbethoxy-2′,4′-dihydroxybenzophenone Although the above are representative members of the class of hydroxybenzophenones which are useful in the present invention, the invention should not be restricted to them. The hydroxybenzophenones are generally conveniently prepared by a Friedel-Crafts ketone synthesis similar to that used in Hardy et al., cited above.

The alkyl halides which may be used as alkylating agents in the invention are those containing up to 20 carbon atoms, for example, methyl chloride, 1-chloropropane, octadecyl chloride, octyl chloride, dodecyl chloride, eicosyl chloride, and the corresponding bromides and iodides.

Although the invention is most advantageously, and preferably, practiced using the alkyl chlorides as alkylating agents, it is equally applicable to the alkyl bromides and iodides since the reaction time is substantially reduced over that in conventional solvents.

While the alkylation reaction can be conducted using stoichiometric amounts of the alkyl halide and hydroxybenzophenone, it is preferred to use an excess of the alkyl halide, i.e., up to about 25% over that required, preferably no more than about 10%.

As the alkali acid acceptor an alkali metal carbonate, bicarbonate or hydroxide is used in slight excess over that required. Sodium or potassium bicarbonates are preferred.

From about 0.1% to about 3% of the metal bromide or iodide may be used as catalyst for the alkylation reaction.

The solvents useful in this process are the mono lower alkyl ethers of ethylene glycol and diethylene glycol; these include cellosolve (mono ethyl ether or ethylene glycol), methyl cellosolve (mono methyl ether of ethylene glycol), propyl cellosolve, butyl cellosolve, hexyl cellosolve, carbitol, and the like. The solvent of choice because of cost and ready availability is cellosolve. Although the amount of solvent is not critical provided sufficient is used to dissolve the reactants, it has been found that the present class of solvent has the ability to afford large amounts of product per batch.

The method of recovery of the product from the reaction mixture is not critical. However, it has been found that the addition of a small amount of sodium hydrosulfite or zinc dust and phosphoric acid to the reaction mixture prior to isolation of the product aids in insuring a high degree of product purity.

The reaction time required in the present invention is an important feature of the invention. The use of the particular solvents herein have permitted the reaction time to be reduced substantially, i.e., from about 15 or more hours to about 2–5 hours.

The invention is more fully described in the following examples.

EXAMPLE 1

A suitable stirred vessel is charged with 251 grams (97% real, 1.14 mole) of 2,4-dihydroxybenzophenone, 193 grams (98% real, 1.27 mole) of octyl chloride, 250 grams of cellosolve, 64 grams (0.604 mole) of sodium carbonate, and 8 grams (0.048 mole) of potassium iodide. The reaction mixture is heated to reflux (140°C.) and water azeotropically removed by distillation during a period of 5 hours. The contents are then cooled to 110°C. and 1.5 grams of zinc dust added; the mixture is then heated to reflux for an additional 30 minutes. The reactants are then cooled to 110°C., 2.0 grams of phosphoric acid (75% real) added, and the mixture filtered to remove insoluble sodium chloride. The filter cake is washed with 150 ml. of cellosolve. The combined filtrate is transferred to a clean vessel and cooled to 28°C. with stirring. Crystallization of the product occurs at 28°C. and after 30 minutes stirring the reaction mixture is cooled to 0°C. to −5°C. using an ice-acetone bath. After 60 to 90 minutes the product is filtered and washed with two 125 ml. portions of methanol. After drying at 40°C. there is obtained 310 grams (83.4% of theory) of 2-hydroxy-4-octyloxybenzophenone having a setting point of 47.4°C.

EXAMPLE 2

Following the procedure of Example 1 except for the use of butyl cellosolve instead of cellosolve there was obtained a yield of 76%.

EXAMPLE 3

Following the procedure of Example 1 except for the use of isobutyl cellosolve instead of cellosolve there was obtained a yield of 79%.

EXAMPLE 4

Following the procedure of Example 1 except that carbitol was used instead of cellosolve, a yield of 92.8% was obtained.

We claim:

1. In the process for alkylating a polyhydroxybenzophenone of the formula:

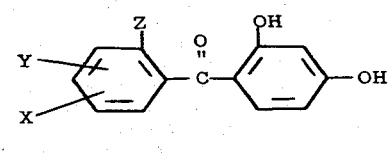

where Z is hydrogen, alkyl, alkoxy, halogen or hydroxy and where X and Y individually are hydrogen, alkyl, alkoxy or halogen to produce an ortho hydroxy, para alkoxybenzophenone of the formula

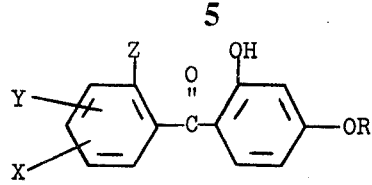

where R is alkyl and Z and X and Y are as defined above; said process involving refluxing the polyhydroxyphenone in a solvent containing an alkyl halide selected from the group consisting of alkyl chlorides, alkyl bromides and alkyl iodides and an acid acceptor for a time sufficient to effect alkylation, and recovering the alkylated product, the improvement which comprises conducting said alkylation in a solvent selected from the group consisting of the mono lower alkyl ethers of ethylene glycol or diethylene glycol.

2. The process of claim 1 wherein the solvent is the mono ethyl ether of ethylene glycol.

3. The process of claim 1 wherein the solvent is the mono methyl ether of ethylene glycol.

4. The process of claim 1 wherein the solvent is the mono ethyl ether of diethylene glycol.

5. The process of claim 1 wherein said polyhydroxybenzophenone is 2,4-dihydroxybenzophenone.

6. The process of claim 5 wherein said alkyl halide is octyl chloride.

7. The process of claim 6 wherein the solvent is the monoethyl ether of ethylene glycol.

* * * * *